Patented Feb. 3, 1931

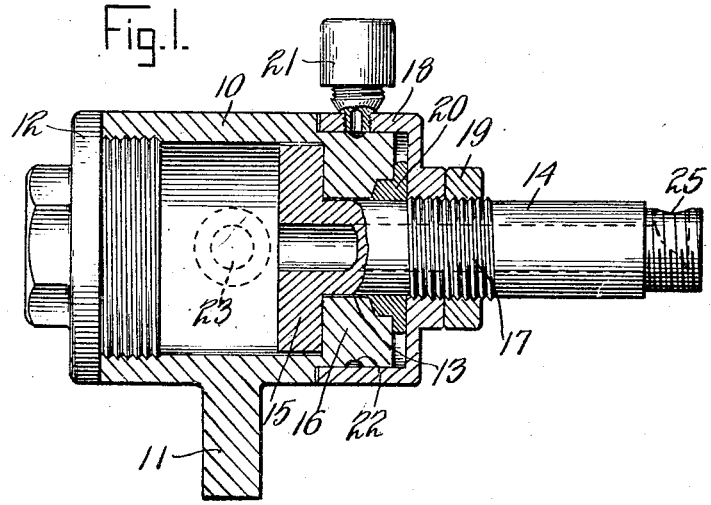
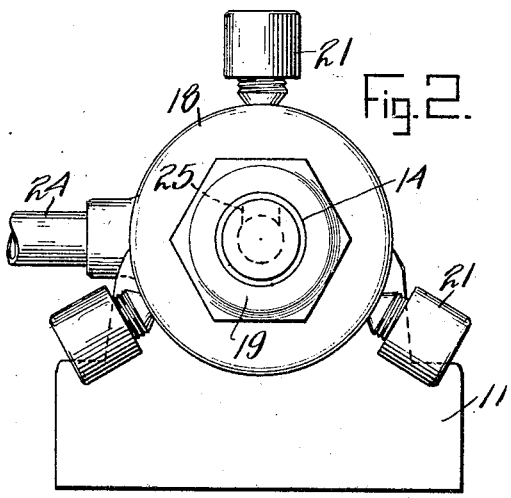

1,791,418

UNITED STATES PATENT OFFICE

NICOLA LUISI, OF AUBURN, NEW YORK

HINGED-PIPE CONNECTION

Application filed August 2, 1929. Serial No. 383,020.

This invention relates to revolving pipe connections or joints and an object of the invention is to provide sealing and lubricating means for a revolving pipe joint.

A further object is to provide a simple and efficient connection between a rotating and non-rotating fluid conduit.

Referring to the accompanying drawing which is made a part hereof and on which similar reference characters indicate similar parts, Figure 1 is a longitudinal sectional view of the device, and Figure 2 is an end elevation of the same.

In the drawings numeral 10 indicates a casing having an integral flange 11 which serves as a base for the casing, one end of the casing 10 may be closed by means of a screw-threaded plug 12, the other end having an opening 13 therethrough in which is revolvingly fitted a pipe 14 having an enlarged head 15 which seats against the inner side of the end 16 of the casing 10. Pipe 14 is preferably threaded at 17 to receive a sealing cup 18 and a lock nut 19, and also may have its outer end threaded at 25. Between the cup 18 and end of the casing 10 is a packing element 20. The flange portion of the cuplike member may be provided with a plurality of oiling cups 21. These may be such cups as are adapted to receive any kind of cup greasing tools, as for example, alemite grease guns. A ring groove 22 is cut in the end of the casing 10 to provide a channel for holding lubricant and to serve for distributing lubricant around the contacting surfaces between the casing 10 and the cup 18. The casing 10 is provided with a bore 23 to which may be attached a pipe 24 for directing fluid into the casing 10 or for conducting it away from the chamber.

In assembling the joint the cap 12 is removed and the pipe 14 is inserted from the left into the casing and the cup-like nut 18 is then screwed upon the pipe to provide sealing contact between the rotating elements 14, 18 and 19 and the stationary packing element 20 and the casing 10. When the packing element has been compressed sufficiently to prevent leakage of fluid an adjusting nut 19 is threaded tightly against the cap to serve as a lock nut.

It will be obvious to those skilled in the art that various changes may be made in my device without departing from the spirit of the invention, and I, therefore do not limit myself to what is shown in the drawings and described in the specification, but only as set forth in the appended claim.

Having thus fully described my said invention, what I claim as new and desire to secure by Letters Patent, is:

A rotating pipe joint comprising a casing having a chamber provided therein, one end of the casing having an inner annular flange, a pipe section having an enlarged head within the casing and having its end extending without the chamber, a packing element surrounding said pipe, and means for compressing the packing element to provide a fluid seal between the chamber in the casing, and the rotating element, the said compressing means comprising a cup secured upon to rotate with the pipe and fitting over the end of the casing, serving to retain a lubricant between the moving surfaces, substantially as set forth.

In witness whereof, I have hereunto set my hand at Auburn, New York, this 15th day of July, A. D. nineteen hundred and twenty-nine.

NICOLA LUISI.